United States Patent [19]
Wilkinson et al.

[11] Patent Number: 5,337,194
[45] Date of Patent: Aug. 9, 1994

[54] METHOD APPARATUS AND METHOD FOR REPRODUCING A FREQUENCY SEPARATED VIDEO SIGNAL STORED ON A RECORDING MEDIUM

[75] Inventors: James H. Wilkinson, Tadley; Terence R. Hurley, Newbury, both of United Kingdom

[73] Assignee: Sony United Kingdom Limited, Staines, United Kingdom

[21] Appl. No.: 809,264

[22] Filed: Dec. 17, 1991

[30] Foreign Application Priority Data

Jan. 11, 1991 [GB] United Kingdom ............ 9100592.6
Aug. 8, 1991 [GB] United Kingdom ............ 9117166.0

[51] Int. Cl.$^5$ ............................................. G11B 5/02
[52] U.S. Cl. ........................................ 360/24; 360/30; 360/33.1; 358/310; 358/335
[58] Field of Search ...................... 360/18, 24, 43, 48, 360/77.01, 77.12, 10.1, 10.3, 77.13, 30, 33.1; 358/335, 337, 338, 133, 137, 166, 31, 47, 310, 330

[56] References Cited

U.S. PATENT DOCUMENTS

| | | | |
|---|---|---|---|
| 4,210,938 | 7/1980 | Heitmann et al. | 360/24 X |
| 4,688,080 | 8/1987 | Wagner | 358/31 |
| 4,864,430 | 9/1989 | Yoshimura et al. | 360/77.01 X |
| 5,027,222 | 6/1991 | Shinbo et al. | 360/24 X |

FOREIGN PATENT DOCUMENTS

| | | |
|---|---|---|
| 0219956 | 4/1987 | European Pat. Off. . |
| 0367264 | 5/1990 | European Pat. Off. . |
| 2126451 | 3/1984 | United Kingdom . |
| 2136243 | 9/1984 | United Kingdom . |

*Primary Examiner*—Andrew L. Sniezek
*Attorney, Agent, or Firm*—William S. Frommer; Alvin Sinderbrand

[57] ABSTRACT

During shuttle mode operation in a system for the reproduction and storage of frequency separated video signals, the read head intersects a plurality of tracks corresponding to different fields of the image rather than following complete tracks. Accordingly, the full information for any one field is not recovered. To provide an image during shuttle mode, the system reads the dc luminance information of the tracks it intersects at the part where this information is stored. As the information content of the dc luminance information is relatively high, a recognisable image can be formed from this information alone. The dc luminance information is stored in the center of the tracks with the other components arranged in order of increasing frequency towards the edge of the tape. The data which is most important to generation of a high quality image is stored in a place where it is less likely to be degraded.

7 Claims, 7 Drawing Sheets

Shuttle

Normal

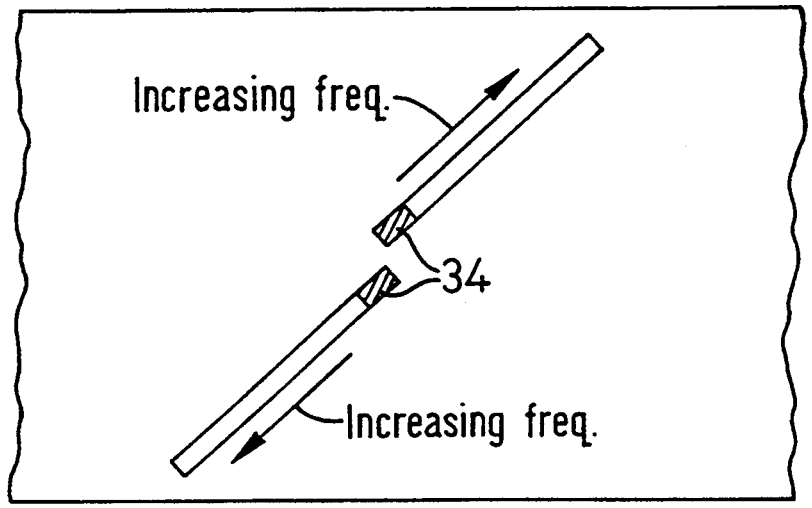
FIG. 9
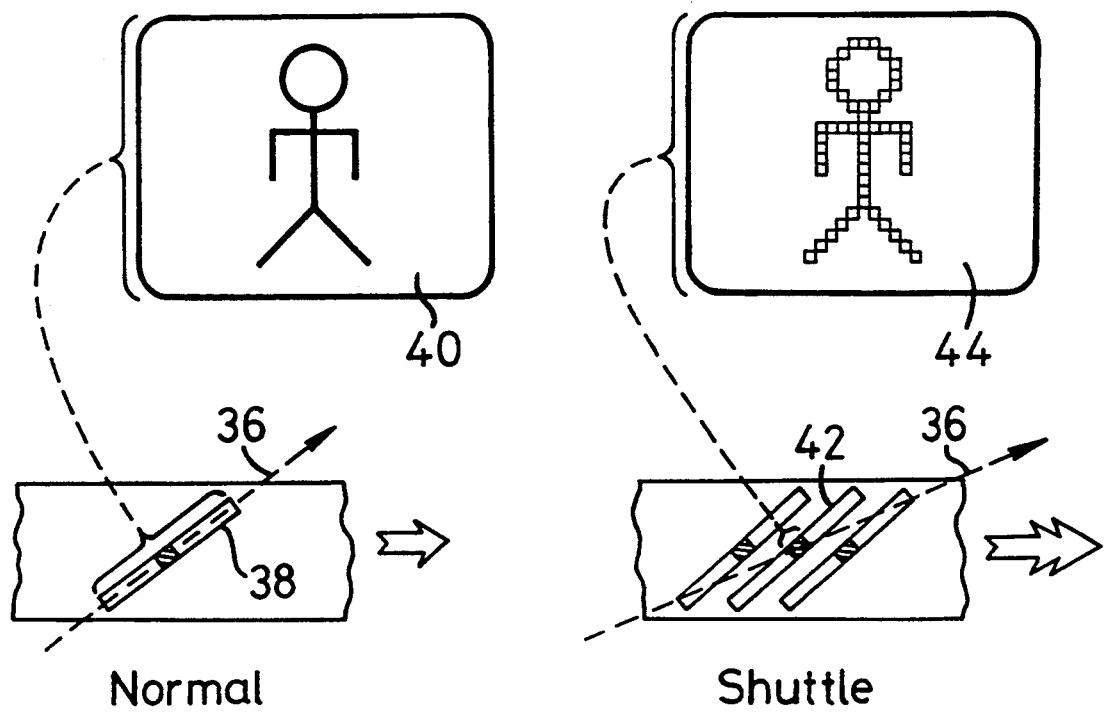
Normal
FIG.10A
Shuttle
FIG.10B

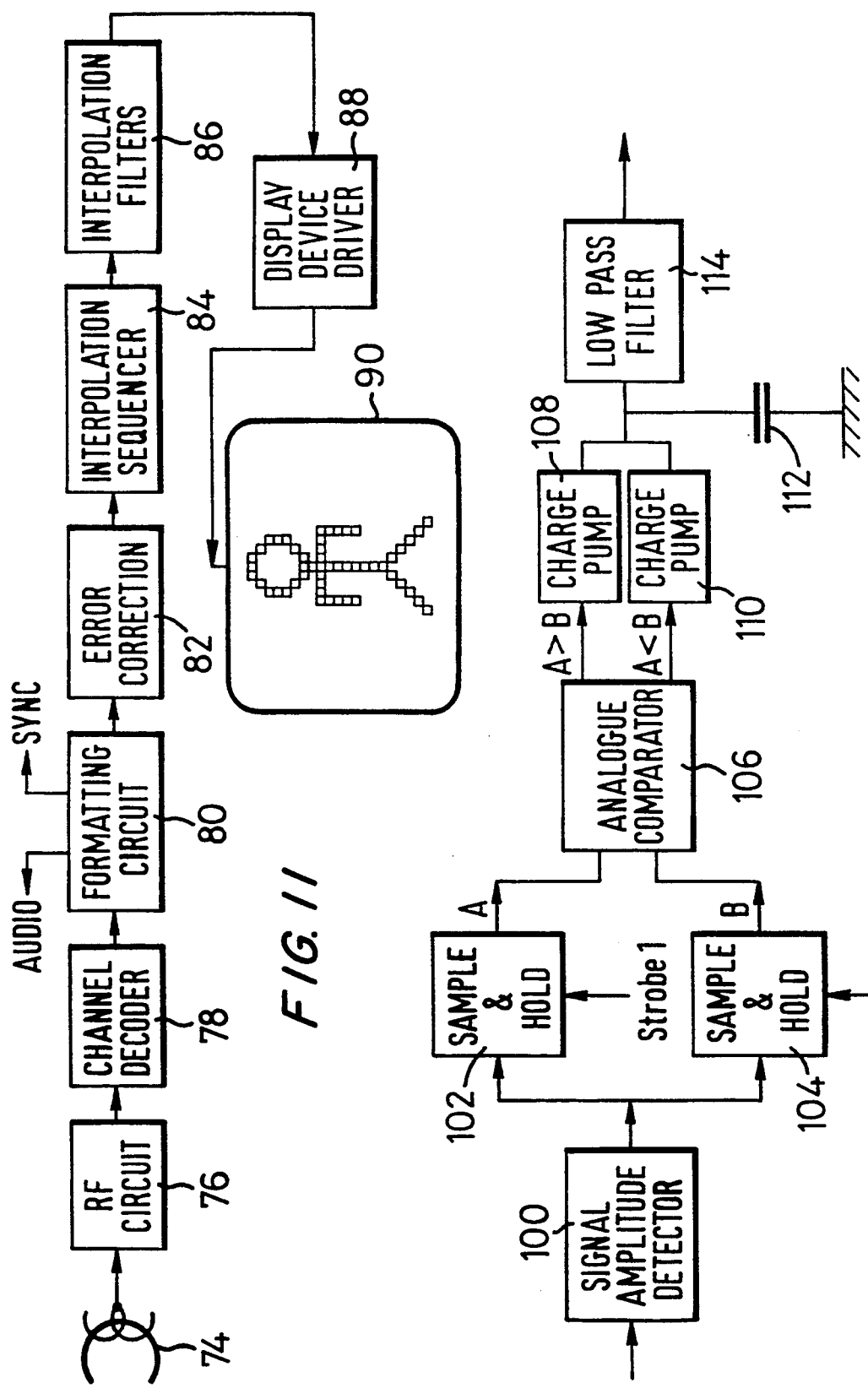

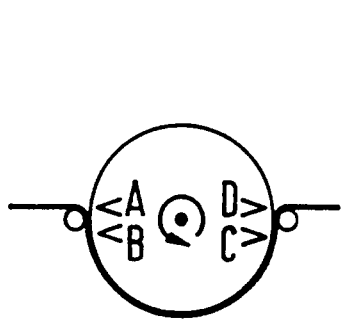
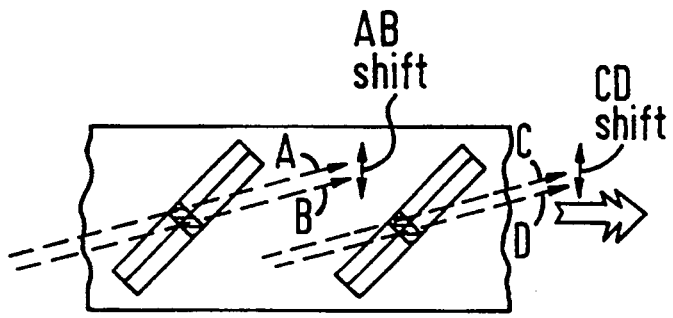
FIG.12A  FIG.12B
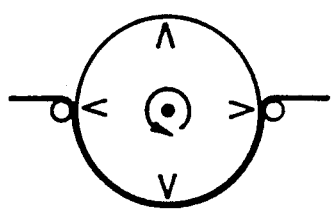
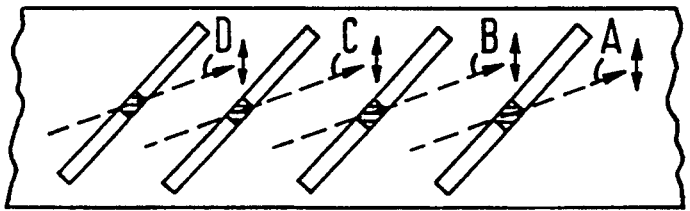
FIG.13A  FIG.13B
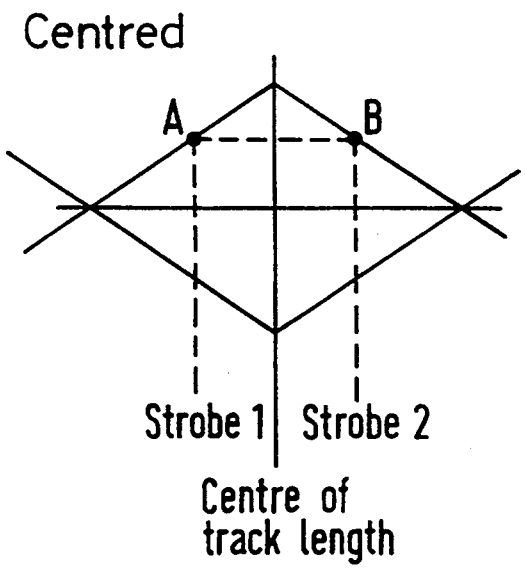
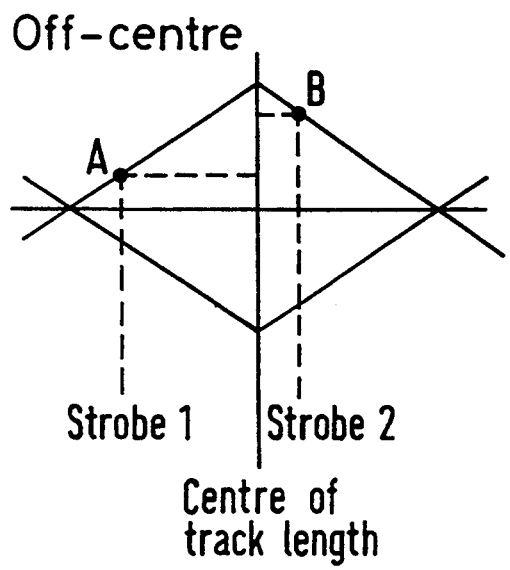
FIG.14A  FIG.14B

METHOD APPARATUS AND METHOD FOR REPRODUCING A FREQUENCY SEPARATED VIDEO SIGNAL STORED ON A RECORDING MEDIUM

BACKGROUND OF THE INVENTION

1. Field of the Invention

This invention relates to the reproduction and storage of video signals. More particularly, this invention relates to the reproduction and storage of coded video signals, such as those that have undergone sub-band coding or discrete cosine transformation.

2. Description of the Prior Art

A task which users of video reproduction and storage systems often want to perform is to locate a particular point within the recorded video signal. To assist in this task it is known to provide some types of system with the ability to display a picture from the current position of the recording medium during shuttle mode operation. When searching through a recorded video signal, such a facility allows the sequence of action to be followed and the point being searched for to be more easily identified.

An example of such shuttle mode playback can be found in some domestic analog video tape recorders. In these systems the video signal is recorded in slanting tracks with position along the tracks corresponding to position within the field. Due to the high speed movement of the tape in shuttle mode, the path of the rotating read head doesn't follow complete tracks to allow the information for one field of the image to be recovered, but instead follows a course intersecting several tracks. However, since the position of the analog signals along each track corresponds to the position in the field, then the signal read from the different tracks intersected represents portions of the complete image from successive fields. Accordingly, if this signal read is output to a display device then it forms a recognisable image. The image produced is interspersed with noise bars corresponding to crossings between tracks, but nevertheless allows the point in the tape being searched fop to be readily identified.

Providing a picture during shuttle operation in a system operating with a frequency separated, and possibly compressed, video signal cannot be achieved in the same manner as in the domestic analog video recorder. Again, the read head is unable to follow complete tracks, but in this case there is no simple relationship between position along the tracks and position in the picture, since the image has been split into different frequency components, as well as possibly being quantised and encoded for compression purposes.

SUMMARY OF THE INVENTION

Viewed from one aspect the invention provides an apparatus for reproducing a frequency separated video signal stored on a recording medium comprising, said apparatus comprising;
  i) a transport mechanism for moving said recording medium in a shuttle mode,
  ii) a read mechanism for reading dc luminance information from predetermined locations on said recording medium during said shuttle mode, and
  iii) a signal processor responsive to said dc luminance information for generating a video signal for display duping said shuttle mode.

The invention overcomes the problem of providing playback during shuttle by recognising that with a frequency separated video signal there is sufficient information in the dc luminance portion alone to generate a recognisable image. Whilst this image is not of high quality, it is adequate to enable a user to identify what position within the recorded video signal has been reached during the shuttle. If additional frequency components can also be recovered then this may improve the image quality, although this is not essential.

In preferred embodiments of the invention said recording medium is magnetic recording tape, said frequency separated video signal is stored as slanting tracks on said magnetic recording tape, said predetermined locations are substantially at the centre of said tracks and said read mechanism has a rotating read head. It will be appreciated that whilst the invention can be applied to different sorts of recording medium, it is particularly applicable when the signal is stored as slanting tracks on magnetic tape to be read with a rotating read head. In addition, storing the dc luminance information in the centre of the tracks within which it is included is advantageous since this portion of the signal is of particular importance to the subsequent regeneration of a high quality picture and the centre of the track is the position where the signal is least likely to be degraded.

In particularly preferred embodiments, differing frequency components of said frequency separated signal are arranged along said tracks in order of increasing frequency moving away from said centre of said tracks. This feature exploits the fact that the higher frequency components of the frequency separated signal are generally less important to the reproduction of a high quality image than the lower frequency components. Accordingly, the most important components are towards the centre of the tape where they are less-likely to be lost, and should the data to be stored on a track exceed the capacity of the physical length of track available, then the components lost due to overrun at the edges will be the least important ones.

The reading of the dc luminance information could be achieved at many different speeds of movement of the tape if, for example, use was made of a measurement of the tape speed and the relative phase of the read head with respect to the predetermined locations where the dc luminance information is stored. However, embodiments of the invention are made simpler if during said shuttle mode, said transport mechanism moves said recording medium at substantially integer multiples of normal playing speed. This feature has the result that the relative phase of the rotating read head with respect to the dc luminance information on the track is substantially constant.

Another preferred feature which helps to improve the quality of the picture recovered during shuttle is that said read mechanism includes at least one read head and means for applying a static offset to said read head to centre said read head on said predetermined locations during said shuttle mode. Centring the read head on the dc luminance information improves the accuracy with which the information may be read.

Whilst the invention may be used with various frequency separated video signals (e.g. video signals that have undergone discrete cosine transformation), the invention is particularly suited to apparatus which is capable of reproducing a frequency separated video signal which is a sub-band coded video signal. With a sub-band coded signal the dc luminance information includes a high proportion of the information of the image and produces a relatively recognisable picture. In addition, if discrete cosine transformation techniques are used then the output is not naturally separated into frequency components and an extra burden of storing and picking through the output data to collect the different frequency components must be supported.

Viewed from a second aspect of the invention provides a method reproducing a frequency separated video signal stored on a recording medium, said method comprising the steps of:

i) moving said recording medium in a shuttle mode,
ii) reading dc luminance information from predetermined locations on said recording medium during said shuttle mode, and
iii) processing said dc luminance information to generate a video signal for display during said shuttle mode.

Viewed from a third aspect the invention provides an apparatus for recording a frequency separated video signal as slanting tracks on magnetic recording tape, said apparatus comprising: a formatting circuit for arranging said frequency separated video signal into portions corresponding to different frequency components such that dc luminance information is recorded at predetermined central locations of said tracks.

This complementary aspect of the invention provides a recording mechanism for recording frequency separated signals in a form suitable to enable a picture to be recovered during shuttle.

Viewed from a fourth aspect, the invention provides a magnetic recording tape having slanting tracks with dc luminance information of a frequency separated video signal stored at predetermined central locations of said tracks.

This further complementary aspect of the invention provides a magnetic tape specially adapted to be used to generate a picture during shuttle.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 illustrates a second embodiment of data tracks storing a frequency separated signal on a magnetic tape;

FIGS. 10a and 10b illustrate the operation of a sub-band coded video tape recorder in both normal and shuttle modes;

FIG. 11 illustrates a circuit for reading the stored signal from a magnetic recording tape;

FIGS. 12a and 12b illustrate one embodiment of a dynamic tracking head arrangement for centring on the dc luminance information;

FIG. 13a and 13b illustrate another embodiment of a dynamic tracking head arrangement for centring on the dc luminance information;

FIGS. 14a and 14b illustrate how the signals derived from the dynamic tracking head arrangements shown in FIGS. 12a, 12b and 13a, 13b are used to centre those heads on the dc luminance information; and FIG. 15 schematically illustrates a circuit for effecting the control illustrated in FIG. 14.

DESCRIPTION OF THE PREFERRED EMBODIMENTS

Figure 1B:
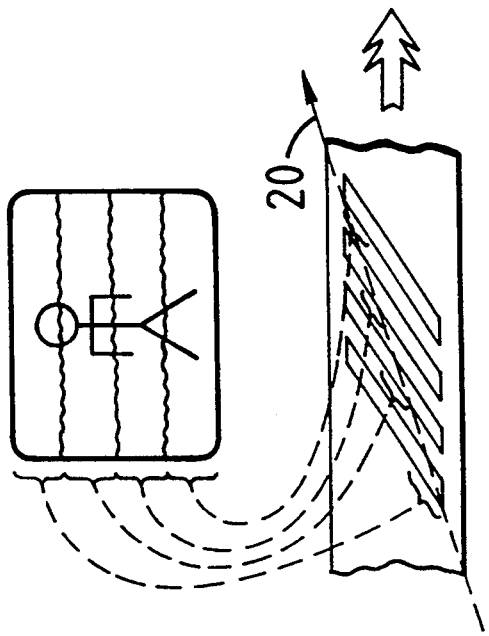
FIGS. 1a and 1b are schematic illustrations of the operation of an analog video tape recorder in both normal and shuttle playback mode.
Figure 1A:
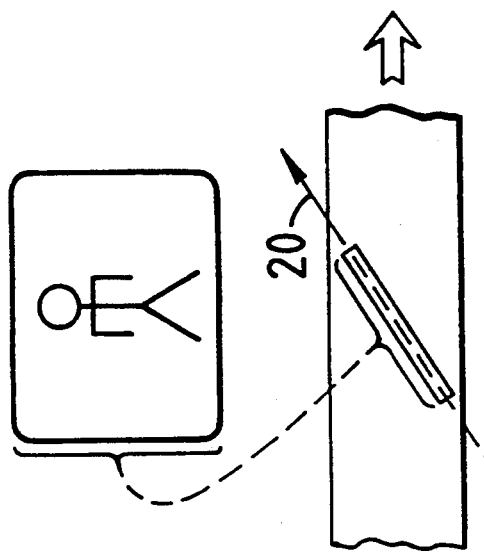

FIG. 1 illustrates the operation of a domestic analog video recorder during normal and shuttle mode playback. In normal mode playback the path 20 of the read head of the recorder follows complete tracks each storing the information for one field of the image. The signal read from the read head representing a complete field is output to a display device to produce the picture. In contrast, during shuttle mode playback the path 20 of the read head crosses a plurality of tracks, and no one track is read in full. However, since the position of the signal along the track corresponds to position within the image, then if the signal read is output to the display device, a recognisable image formed of different portions of successive fields will be produced. The image will include noise bars corresponding to the crossings between tracks, but these are not sufficient to render the picture unrecognisable.

Figure 2:
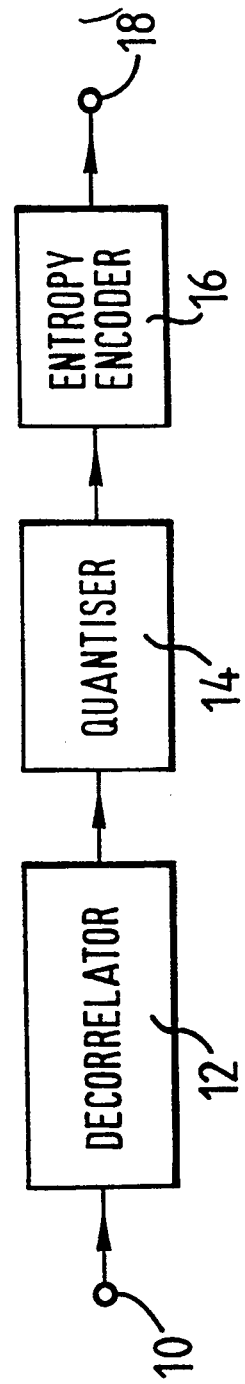
FIG. 2 is a schematic illustration of a video signal frequency separation and compression system.

FIG. 2 shows an apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is fed by the decorrelator 12 to a quantiser 14 and then to an entropy encoder 16, which together compress the frequency separated video signal generated by the decorrelator 12 to produce a compressed signal on an output 18. The compressed signal can then be stored. After storage, the compressed signal can be restored substantially to its original form by expansion by way of entropy decoding, dequantising and correlation operations which employ parameters converse to those used for decorrelation, quantisation and entropy encoding, respectively, upon compression.

The operation of decorrelation performed in the decorrelator 12 relies upon the fact that neighbouring pixels of an image are highly correlated, whereby processing an image (for example, a field or frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image. The quantisation operation, which is a lossy operation, in that it involves deliberate reduction of the resolution of some frequency data considered to be redundant or of little importance to adequate perception of the image by the human psychovisual system, in itself enables some signal compression to be achieved. The quantiser 14 enables compression to be achieved in two ways: it reduces the number of levels to which the data fed to it can be assigned, and it increases the probability of runs of zero value samples on the data it outputs. The ability to achieve signal compression provided by the operation of the quantiser is carried into effect in the entropy encoder 16 in that the reduction in information content achieved in the quantiser 14 enables a consequential bit (data) rate reduction to be achieved in the entropy encoder.

Further (non-lossy) compression, and bit (data) rate reduction, is provided in the entropy encoder 16 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which it is much more probable that certain levels will occur than others.

The compression/coding system or apparatus as shown in FIG. 2 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 1 described in a proposed standard prepared by the Joint Photographic Experts Group and currently under review by the International Standards Organisation. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of $8 \times 8$ samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 2 would comprise a spatial (two-dimensional) sub-band filtering arrangement which divides the input video signal into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform .technique, there is no restriction to operation on a block-by-block basis: the sub-band filtering can be applied directly to the video signal.

Figure 3:
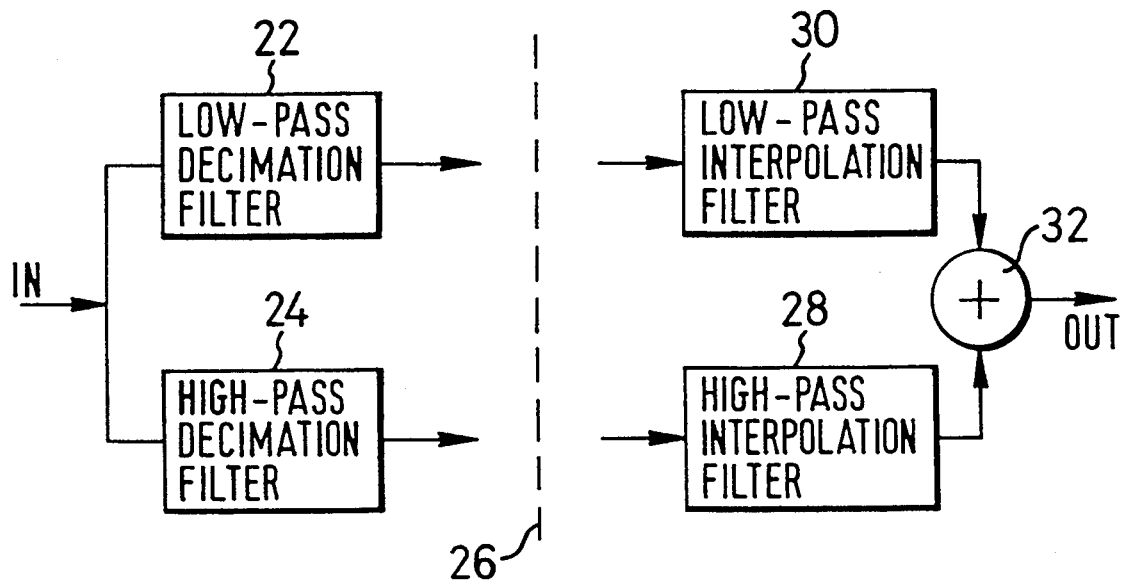
FIG. 3 is a simple sub-band coding system.

FIG. 3 illustrates a sub-band coding system in which the input video signal is passed through a low-pass decimation filter 22 and a high-pass decimation filter 24. The resulting two output signals represent different portions of the frequency spectrum of the input signal. Optionally, the two signals could then be quantised and entropy encoded as discussed in relation to FIG. 2. The sub-band components of the input signal can now be stored for later reproduction, e.g. stored on a magnetic recording tape. It is of note that having been split into frequency sub-bands there is no one-to-one relationship of a portion of the signal to a point within the image as was the case for the analog system of FIG. 1. The storage of the sub-band components into the recording medium is illustrated by the dashed line 26 in FIG. 3.

When the sub-band components are recovered from the recording medium they are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original video input signal.

Figure 4:
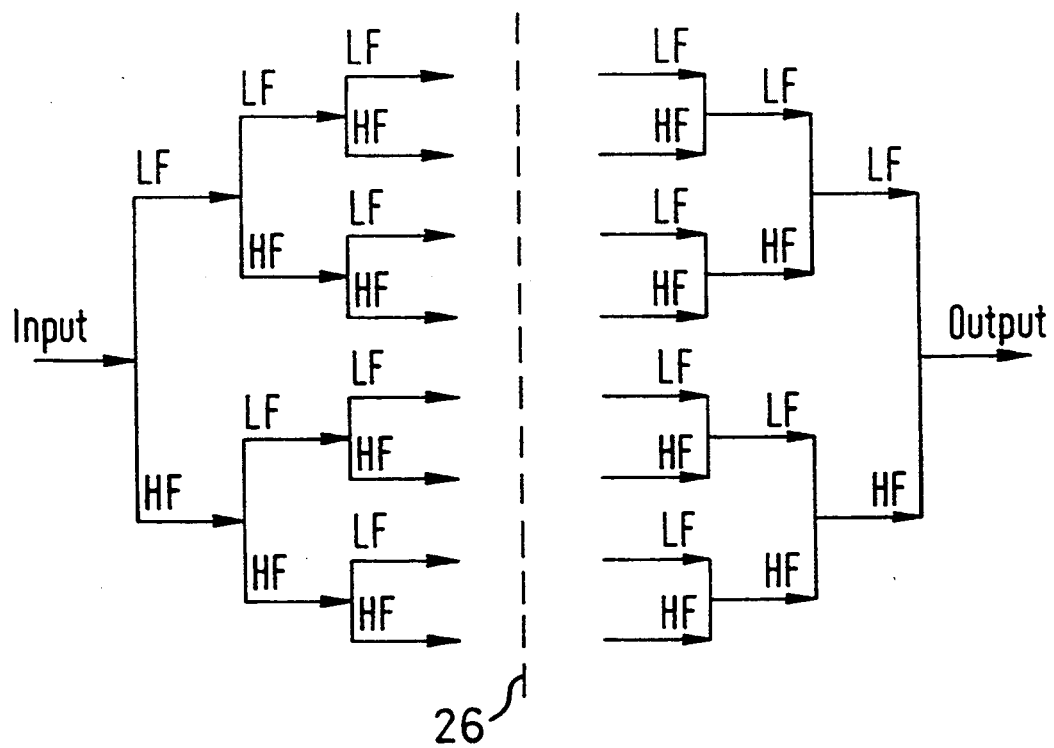
FIG. 4 is a higher order sub-band coding system.

FIG. 3 illustrates the decomposition of the input video signal into two sub-bands. In practice, the input video signal would be decomposed into many more sub-band components. FIG. 4 illustrates the decomposition of an input signal into eight sub-band components and its subsequent recombination into an output video signal.

The filters of the sub-band coding system comprise finite impulse response filters with appropriate delays and weighting coefficients to perform both horizontal and vertical frequency decomposition. Different forms of filter for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

Figure 5:
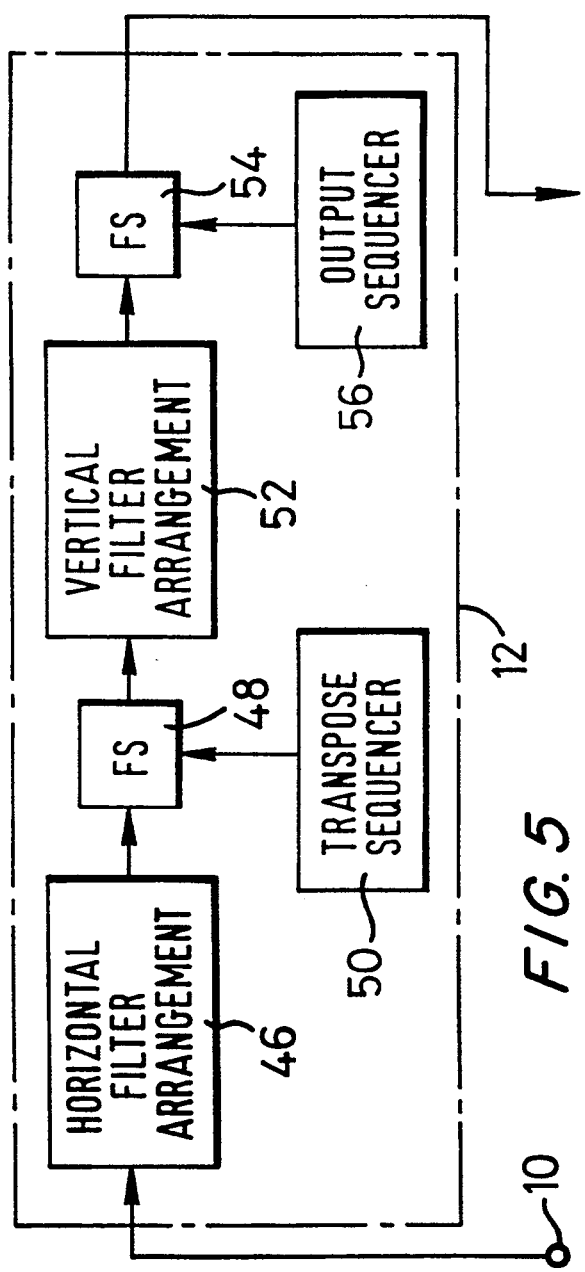
FIG. 5 illustrates a two-dimensional sub-band decorrelator.

FIG. 5 illustrates the decorrelator 12 of FIG. 2 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 5, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 ($8 \times 8$) sub-bands is to be produced. The 64 sub-bands are to be of equal extent to one another.

The horizontal filter arrangement 46 is preferably of a tree or hierarchical structure as shown in FIG. 4, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LF-and HF, respectively. Thus, the LF and HF produce outputs comprising low pass filtered and high pass filtered versions of the input line, respectively, the outputs representing the spatial frequency content of the line in the upper and lower halves of the horizontal spatial frequency range. That is, the first stage divides the input line into two sub-bands in the horizontal direction. The decimators decimate (sub-sample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there ape four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate (sub-sample) the respective outputs by a o factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital video signal. This results in the intermediate field store 48 containing a version of the field of the input digital video signal that has been filtered into eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 56 can be considered to have been partitioned into an array of 64 (8×8) storage regions, in each of which a respective one of the 64 sub-bands is stored. Thus, successive fields of the input digital video signal are sub-band filtered and passed, duly filtered, to the quantiser 14 after a delay of two field intervals.

The transpose sequencer 50 produces read addresses for the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the intermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, that is rotated through 90 degrees, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and reordered by the output sequencer 56 before being passed to the rest of the apparatus for processing.

Figure 6:
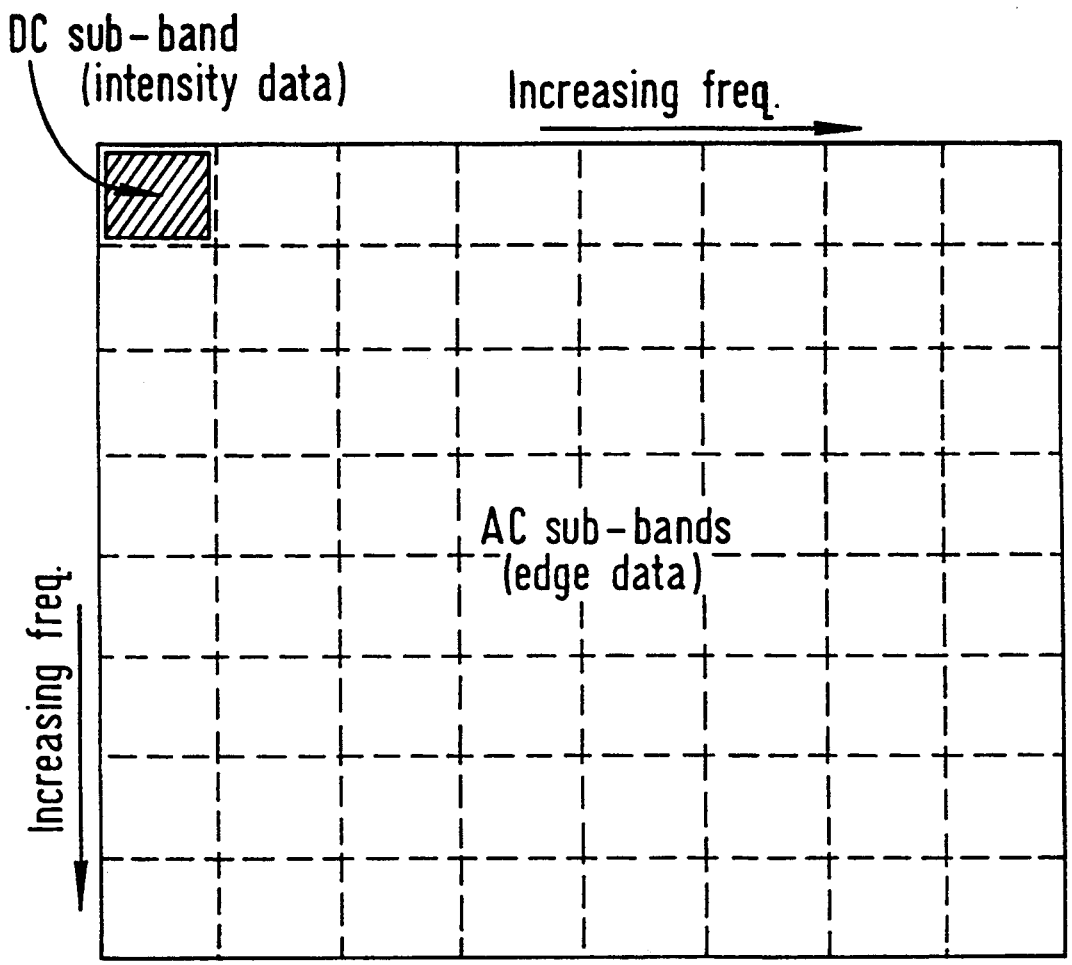
FIG. 6 illustrates a frequency separated video signal.

FIG. 6 illustrates the various sub-band components produced if the input video signal is decomposed both horizontally and vertically into eight frequency components (this can be considered to be the data stored in the output field store 54 after it has had the reordering of the output sequencer 56 applied to it). Each of these sub-bands or sub-pictures is represented by one of the blocks in FIG. 6. The upper left hand block represents the dc sub-band. This is the band of lowest horizontal and vertical frequency although in practice it doesn't necessarily represent only the constant portions of the signal with strictly zero frequency. This dc sub-band will contain the majority of the dc luminance information of the original input video signal. The relative importance of the remaining sub-bands to the eventual perception of the picture by a viewer varies. Generally speaking, the higher frequency sub-bands are less important to the eventual perception of a viewer. In relation to FIG. 6, the frequency which a particular sub-band component represents increases as one moves downward and/or rightward in the array of blocks.

Figure 7:
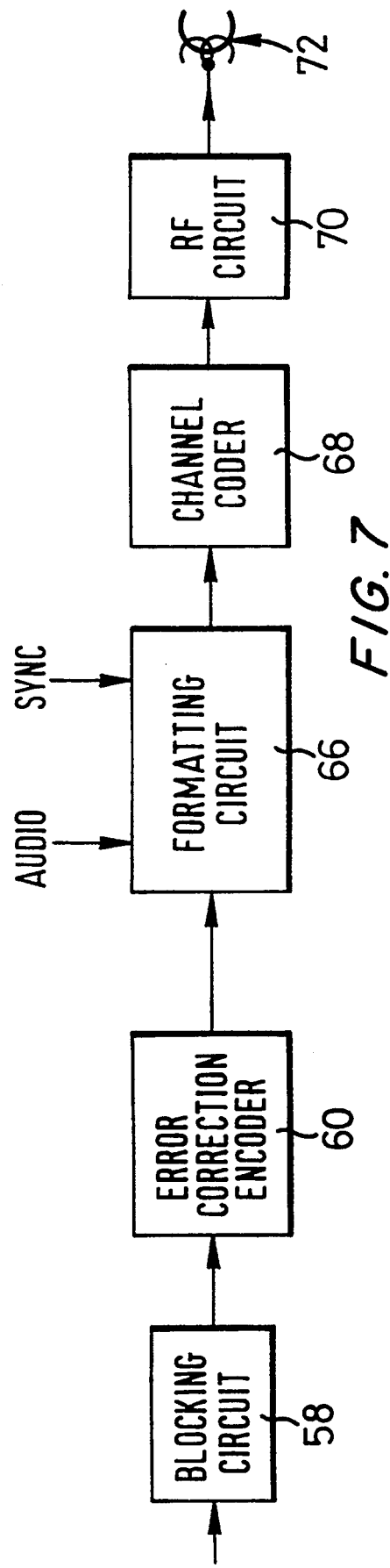
FIG. 7 illustrates a circuit for storing a frequency separated signal on magnetic recording tape.

FIG. 7 illustrates a circuit for storing the sub-band filtered data read from the output field store 54 under control of the output sequencer 56 on to magnetic recording tape. A blocking circuit 58 divides data read from the output field store 54 into segments of fixed length and supplies them to an error correction encoder 60.

The error correction encoded data emerging from the encoder 60 is directed to a formatting circuit 66 in which that data is arranged, together with audio data and synchronisation data, into a format to be recorded on tape. The operation performed by the formatting circuit 66 is thus conventional, though (as explained below) the actual format employed is not conventional.

Formatted data outputted by the formatting circuit 66 is, in conventional manner, directed via a channel coder 68 and a radio frequency (RF) circuit 70, containing amplifiers, filters and so forth, to a recording head 72. The magnetic recording tape mechanism itself is essentially standard in principle, with a rapidly rotating read/write head recording the frequency separated signal read from the formatting circuit 66 onto slanting tracks on a magnetic tape.

Figure 8:
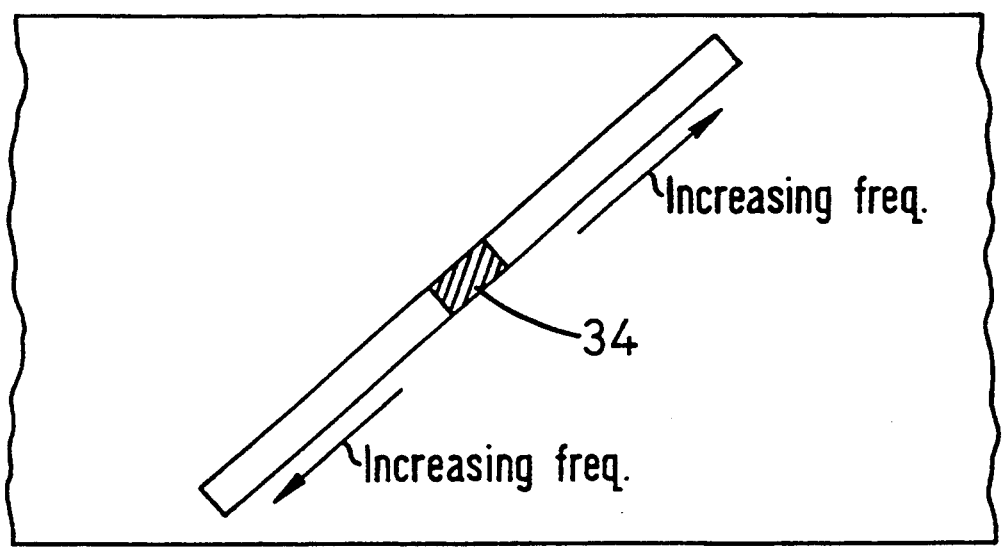
FIG. 8 illustrates a first embodiment of a data track storing a frequency separated signal on a magnetic tape.

FIG. 8 illustrates how the sub-bands are distributed along slanting tracks on the magnetic recording tape with the dc band 34 at the centre of the tape and the bands of successively increasing frequency disposed in frequency order out towards the edges of the tape. This ordering is achieved by the formatting circuit 66.

FIG. 9 shows an alternative embodiment in which two tracks are used to record each field, with the dc sub-band at the centre and the bands of increasing frequency disposed towards the edge.

FIG. 10 illustrates the normal and shuttle operation of the sub-band coded system. In normal operation the read head follows a path 36 along the full length of the track 38. All the sub-band components from the track 38 are recovered and the complete high quality picture 40 can be recovered via the interpolation filters.

In contrast, during shuttle mode operation the tape speed is such that the path 36 of the read head does not follow the full length of any given track, but in fact intersects several tracks. The point at which the read head crosses one of the tracks can be controlled to correspond to approximately the centre of that track where the dc luminance information is stored. In the case illustrated this is track 42.

The system can help to ensure the dc luminance information is recovered by controlling the speed of the shuttle mechanism to be an integer multiple of the normal tape play speed. In this way the phase of the read head relative to the dc luminance information remains constant. As discussed below in relation to FIGS. 12, 13 and 14, a static offset can be applied to the head to improve pick-up of the dc luminance information. In contrast, no particular effort is made to read any of the other sub-band components and accordingly these will be read with varying degrees of effectiveness depending upon the amount of misalignment between the read head and the track as the read head passes. The information from track 42 is fed to the circuit illustrated in FIG. 11 to produce the image 44. The image produced will have a block-like/heavily filtered appearance as a consequence of the fact that it is derived from only a part of the full information representing that image. By observing the image 44 a user of the system may conveniently identify the position within the tape for which the user is searching.

As illustrated in FIG. 11, a read head 74 feeds the signal to an RF circuit 76 where it is amplified and equalised. The signal then passes through a channel decoder 78 to a formatting circuit 80, where the audio and synchronisation information is separated out and the image data collected together. Error correction circuit 82 detects any errors and corrects them using the error correction data included in the signal by the error correction encoders 60 and 62. The output from the error correction circuit 88 then passes to an interpolation sequencer 84 where the data is buffered and then read out in the order required by tree-structured interpolation filters 86. This reordering is the converse of the operation that was performed by the output sequencer 56 described above. The interpolation filters 86 are the complementary filters to those illustrated in FIG. 5. The output of the interpolation filters 86 is fed to a display device driver 88 where it is converted from digital to analog form for application to a display device 90.

As described above, during shuttle mode the movement of the tape and head movement are synchronised so that the dc luminance information is correctly read. The information for the other components will be read to a lesser or greater extent depending upon its position on the tracks. The full output from the read head 74 is processed by the circuit of FIG. 11, but since the dc luminance information represents a large proportion of the information content of the image, the incomplete and/or incorrect reading of the high frequency components doesn't prevent the formation of a recognisable image. It would be possible, if desired, to mask out the high frequency components from the data fed to the interpolation filters 86.

FIG. 12 illustrates a system with two pairs (A, B; C, D) of heads of the dynamic tracking type. The dynamic tracking head pairs have a static offset applied to them to adjust the position at which the pairs of heads cross the tracks so as to improve the reading of the dc luminance information during shuttle playback. Each pair of heads may have a different offset applied to it.

FIG. 13 illustrates an alternative embodiment with four independent dynamic tracking heads (A, B, C, D). Each of these heads has its own offset applied to it so as to centre the head with respect to the dc luminance information of its respective track upon the tape.

FIG. 14 illustrates how the required offset can be derived. The system measures the output from each head at either side of the what the system currently regards as the track centre and applies an offset until these outputs are equal. When the output magnitude on each side of the track centre is equal then the head is correctly centred on the dc luminance portion of the track. A conventional negative feedback circuit is used to control head offset duping shuttle in dependence upon the difference of the signal amplitudes on either side of the currently effective track centre position.

FIG. 15 schematically illustrates a circuit for effecting the control described above. The signal from a respective read head is fed to a signal amplitude detector 100. The signal amplitude detector 100 removes the variation in the signal due to the data it represents and produces a signal indicative of how strong the signal is, i.e. how well the read head is aligned with the track. The output from the signal amplitude detector 100 is fed to two sample and hold units 102 and 104. The strobe signals applied to the sample and hold units 102 and 104 control the instant at which they read the output from the signal amplitude detector 100. The strobe signals Strobe 1 and Strobe 2 are timed such that if the read head was properly aligned with the track, then they would occur at instants when the read head was at points an equal distance either side of the centre of the track length. The outputs of the sample and hold units 102 and 104 correspond to the signals A and B in FIG. 14.

The signals A and B from the sample and hold units 102 and 104 are fed to an analogue comparator 106. The analogue comparator 106 produces an output on one of either of two lines in dependence upon whether $A > B$ or $A < B$. The output of the analogue comparator 106 is proportional to the difference between A and B. The outputs from the analogue comparator 106 are fed to a capacitor 112 and a low pass filter 114 where they are stored and smoothed. The output from the low pass filter 114 represents the degree of offset that must be applied to the head to centre it on the track. If the head is of the dynamic tracking type having piezo-electric mountings then the signal can be fed to the mounting. Alternatively, the output could be used to adjust the angle of a rotating drum head relative to the tape to bring about the appropriate correction.

The circuit of FIG. 15 may be implemented in digital form. In that event, a predictive circuit could be added, so that if the tape speed is not an integer multiple of normal play speed, a prediction of the required offset could be inserted into the last known offset. The prediction would depend upon the value of a tape speed indicator. The result of the offset would be filtered prior to application.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for reproducing a frequency separated video signal stored on a recording medium, said stored frequency separated video signal having dc luminance information recorded at predetermined locations on said recording medium and other video information recorded at other locations on said recording medium, said apparatus comprising:
   a transport mechanism for moving said recording medium in a shuttle mode;
   a read mechanism for reading said dc luminance information from said predetermined locations on said recording medium during said shuttle mode; and
   a signal processor responsive to said dc luminance information for generating a video signal for display during said shuttle mode.

2. An apparatus as claimed in claim 1, wherein said recording medium is magnetic recording tape, said frequency separated video signal is stored as slanting tracks on said magnetic recording tape, said predetermined locations are substantially at the center of said tracks and said read mechanism has a rotating read head.

3. An apparatus as claimed in claim 2, wherein during said shuttle mode said transport mechanism moves said recording medium at substantially integer multiples of normal playing speed.

4. An apparatus as claimed in claim 1, which is capable of reproducing a frequency separated video signal which is a sub-band coded video signal.

5. An apparatus for reproducing a frequency separated video signal stored as slanting tracks on a magnetic recording tape wherein differing frequency components of said frequency separated signal are arranged along a track in order of increasing frequency moving away in at least one direction along the track from a center of the track, comprising:
   a transport mechanism for moving said magnetic recording tape in a shuttle mode;
   a read mechanism for reading dc luminance information from predetermined locations on said magnetic recording tape during said shuttle mode, said read mechanism having a rotating read head and said predetermined locations being located substantially at the center of each track; and
   a signal processor responsive to said dc luminance information for generating a video signal for display during said shuttle mode.

6. An apparatus as claimed in claim 5, wherein said read mechanism includes at least one read head and means for applying a static offset to said read head to center said read head on said predetermined locations during said shuttle mode.

7. A method of reproducing a frequency separated video signal stored on a recording medium, said stored frequency separated video signal having a dc luminance information recorded at predetermined locations on said recording medium and other video information recorded at other locations on said recording medium, said method comprising the steps of:
   moving said recording medium in a shuttle mode;
   reading said dc luminance information from said predetermined locations on said recording medium during said shuttle mode; and
   processing said dc luminance information to generate a video signal for display during said shuttle mode.

* * * * *